United States Patent
Suzuki et al.

(10) Patent No.: US 7,080,862 B2
(45) Date of Patent: Jul. 25, 2006

(54) BUMPER BEAM STRUCTURE

(75) Inventors: Toshihiko Suzuki, Saitama (JP); Yoshiharu Itai, Saitama (JP); Kazuo Omura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/031,880

(22) Filed: Jan. 7, 2005

(65) Prior Publication Data

US 2005/0156443 A1    Jul. 21, 2005

(30) Foreign Application Priority Data

Jan. 21, 2004    (JP)    ............... 2004-013417

(51) Int. Cl.
*B60R 19/24* (2006.01)
(52) U.S. Cl. .................................... 293/154
(58) Field of Classification Search ............... 296/154, 296/155; 293/154, 155
See application file for complete search history.

(56) References Cited

U.S. PATENT DOCUMENTS 6,338,510 B1 *    1/2002    Kanamori et al. .......... 293/154
2003/0034661 A1 *    2/2003    Gotanda et al. ............ 293/155

FOREIGN PATENT DOCUMENTS

JP    0033150    *    2/1985    ................. 293/155
JP    2001-088633    4/2001

* cited by examiner

*Primary Examiner*—Dennis H. Pedder
(74) *Attorney, Agent, or Firm*—Carrier, Blackman & Associates, P.C.; William D. Blackman; Joseph P. Carrier (57) ABSTRACT

A bumper beam structure includes a beam extending transversely of a vehicle and right and left corned members attached to right and left ends of the beam. The beam is mountable to front ends of right and left vehicle frame members via the right and left corner members. The beam and the right and left corner members are all extruded members. The beam is disposed with its axis in an extrusion direction oriented transversely of the vehicle. The right and left corner members are disposed with their axes in an extrusion direction oriented vertically of the vehicle.

20 Claims, 7 Drawing Sheets

BUMPER BEAM STRUCTURE

FIELD OF THE INVENTION

The present invention relates to bumper beam structures, and more particularly, to bumper beam structures in which right and left corner members are attached to right and left ends of a beam, and the beam is mounted to a vehicle frame via the corner members.

BACKGROUND OF THE INVENTION

A bumper structure consisting of a beam extending transversely of a vehicle at the vehicle front, right and left mounting members attached to right and left ends of the beam, respectively, and right and left frame members mounted with the right and left mounting members, respectively, is disclosed in Japanese Patent Laid-Open Publication No. 2001-88633, for example. This bumper structure will be described below with reference to FIG. 7.

Figure 7:
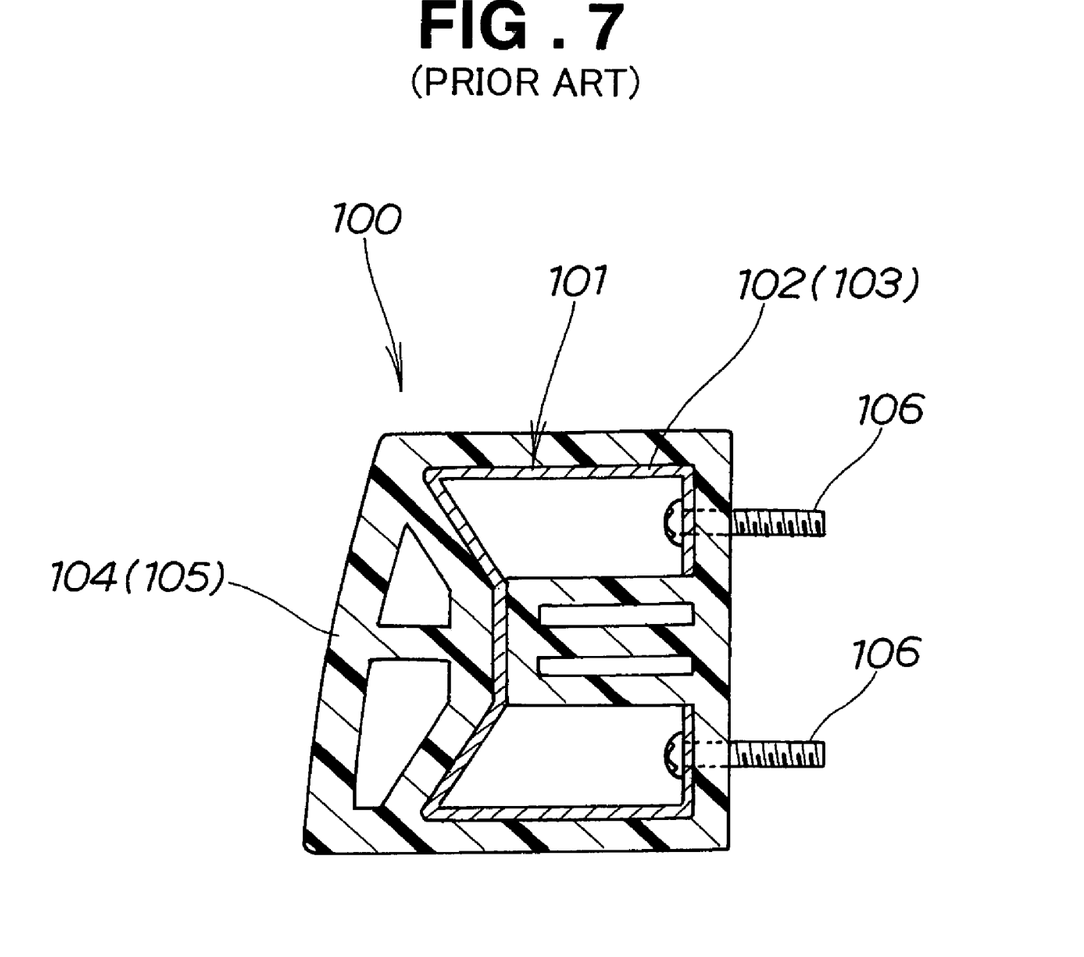
FIG. 7 is a cross-sectional view of a conventional bumper structure.

A bumper structure 100 includes an M-shaped cross-section beam 101 extending transversely of an automobile, and left and right polymeric corner members 104, 105 constituted by extruded members, fitted to left and right ends 102, 103 of the beam 101, respectively. The corner members 104, 105 are mounted to a vehicle frame (not shown) by a plurality of bolts 106.

This bumper structure 100, which is formed by rolling the beam 101 and then extruding the left and right corner members 104, 105 to the left and right ends of the beam 101, respectively, requires equipment in which a rolling mill (not shown) for the beam 101 is integrated with an extruding machine (not shown) for the left and right corner members 104, 105. The integration of the rolling mill and the extruding machine leads to large equipment, increasing the cost of equipment.

On the other hand, another method of attaching the left and right corner members 104, 105 to the beam 101 is possible as described below.

In this method, first, rolling of the beam 101 and extrusion of the left and right corner members 104, 105 are performed in separate steps. That is, the M-shaped beam 101 and the left and right corner members 104, 105 are manufactured separately.

Then, the left and right corner members 104, 105 manufactured by extrusion molding are inserted in a nested manner into the left and right ends 102, 103 of the beam 101 manufactured by rolling, to mount the left and right corner members 104, 105 to the left and right ends 102, 103 of the beam 101, respectively.

Thereafter, the corner members 104, 105 are mounted to the vehicle frame (not shown) by the bolts 106.

In this method, however, since the left and right corner members 104, 105 are inserted into the M-shaped beam 101, it is necessary to increase the precision of the beam 101 and the precision of the left and right corner members 104, 105. Accordingly, it is necessary to increase the machining accuracy of the rolling mill for rolling the beam 101 and the extruding machine for extruding the left and right corner members 104, 105, resulting in increased costs of the machines.

The left and right corner members 104, 105 attached to the left and right ends of the beam 101 are located at the left and right front corners of the automobile. On the right and left front corners of an automobile, an impact force will act obliquely from the front of the vehicle.

To deal with an oblique impact force from the front of the vehicle, it is preferable to form corners of the left and right corner members 104, 105 in a curved shape, and it is further preferable to increase the curvature of the curve.

However, like the beam 101, the left and right corner members 104, 105 are members extruded in a vehicle transverse direction. Therefore, it is difficult to form the corners (left and right ends) 102, 103 in a curved shape to deal with an oblique impact force from the front. In other words, it takes time to form the corners (left and right ends) 102, 103 of the left and right corner members 104, 105 in a curved shape, which prevents increase in productivity.

Further, the axial direction of extrusion in which the left and right corner members 104, 105 are extruded is the same direction as the extrusion direction of the beam 101. Therefore, even when the left and right corner members 104, 105 are inserted and fitted into opposite ends of the beam 101, the ends of the beam 101 and the laterally outer ends of the left and right corner members 104, 105 are in an open state. Consequently, an impact force applied obliquely from the front is not effectively transmitted to the vehicle frame.

Thus, there is a desire for a bumper beam structure which allows for reduced cost of equipment and increased productivity.

SUMMARY OF THE INVENTION

According to an aspect of the present invention, there is provided a bumper beam structure, which comprises: a beam capable of being disposed at a front portion of a vehicle body in such a manner as to extend in a vehicle transverse direction; and right and left corner members attached to right and left ends of the beam, respectively; the beam being mountable to front ends of vehicle frame members via the right and left corner members; wherein the beam is an extruded member, and is disposed with an axis in an extrusion direction oriented in the vehicle transverse direction; and the right and left corner members are extruded members, and are attached to the right and left ends of the beam, each with an axis in an extrusion direction oriented in a vertical direction.

Since the beam and the right and left corner members are extruded as described above, the members can be continuously manufactured, resulting in efficient manufacturing of the beam and the right and left corner members.

An impact force can act obliquely from the front of the vehicle on the right and left corner members. It is therefore preferable to provide the right and left corner members with large areas to receive an oblique impact force from the vehicle front. Therefore, it is preferable to form the areas to receive an oblique impact force from the vehicle front in an inclined shape to be orthogonal to the impact force.

Generally, however, a member manufactured by extrusion molding (extruded member) extends linearly in an extrusion direction. If extruded members are arranged horizontally as the right and left corner members, it is required to machine corners of the extruded members in an inclined shape to provide large areas to receive an oblique impact force from the front.

In the present invention, since a side wall of an extruded member can be formed in an inclined shape, the axes in the extrusion direction of the extruded right and left corner members are oriented vertically of the vehicle for use. Accordingly, side walls of the right and left corner members can constitute the areas of the right and left corner members to receive an oblique impact force from the front. With this, the areas of the right and left corner members to receive an oblique impact force from the front of the vehicle can be formed in an inclined shape or in a curved shape when the right and left corner members are extruded. This eliminates the step of machining corners of the right and left corner members in an inclined shape or in a curved shape.

In an embodiment of the present invention, the right and left corner members each preferably have a plurality of closed cross-section portions formed in the extrusion direction. Thus, the right and left corner members can be relatively easily provided with strength. The number and the shape of the closed cross-section portions can be appropriately adjusted to relatively easily provide required strength to the right and left corner members.

Also, according to the embodiment, the right and left corner members preferably have respective supporting portions formed toward the right and left ends of the beam for supporting the right and left ends, and have respective walls extending from the supporting portions close to the vehicle frame members for reinforcing the supporting portions.

Thus, the right and left ends of the beam are supported by the supporting portions of the right and left corner members, and the supporting portions are reinforced by the walls. The thickness of the walls can be adjusted to easily adjust the strength of the supporting portions, which facilitates provision of a desirable strength required by the bumper beam.

The beam and the right and left corner members are preferably made from aluminum material. Aluminum material is molded relatively easily, and is a suitable material for extrusion molding. The beam and the corner members are made from aluminum material to increase productivity of the bumper beam. Aluminum material is a light material, resulting in a reduced weight of the bumper beam.

According to the embodiment of the present invention, the right and left corner members are preferably connectable to the vehicle frame members via respective mounting brackets made from extruded aluminum material. Accordingly, the degree of freedom in determining the shape and layout of the right and left corner members is increased, as compared with a case where the right and left corner members are directly connected to the front ends of the vehicle frame members without using mounting brackets. The mounting brackets are aluminum extruded members, enabling a reduction in weight of the bumper beam.

The right and left corner members preferably have respective front walls extending in the vertical direction, the front walls being inclined toward the front ends of the vehicle frame members at outer side portions opposite to attached sides to the right and left ends of the beam. When the front walls constituting corners of the corner members are inclined as described above, an impact force applied obliquely from the vehicle front is generally orthogonal to the corresponding front wall, and therefore the impact force can be transmitted efficiently to the vehicle frame member via the corner member.

BRIEF DESCRIPTION OF THE DRAWINGS

Preferred embodiments of the present invention will be described in detail below, by way of example only, with reference to the accompanying drawings, in which.

DETAILED DESCRIPTION OF THE PREFERRED EMBODIMENTS

Figure 1:
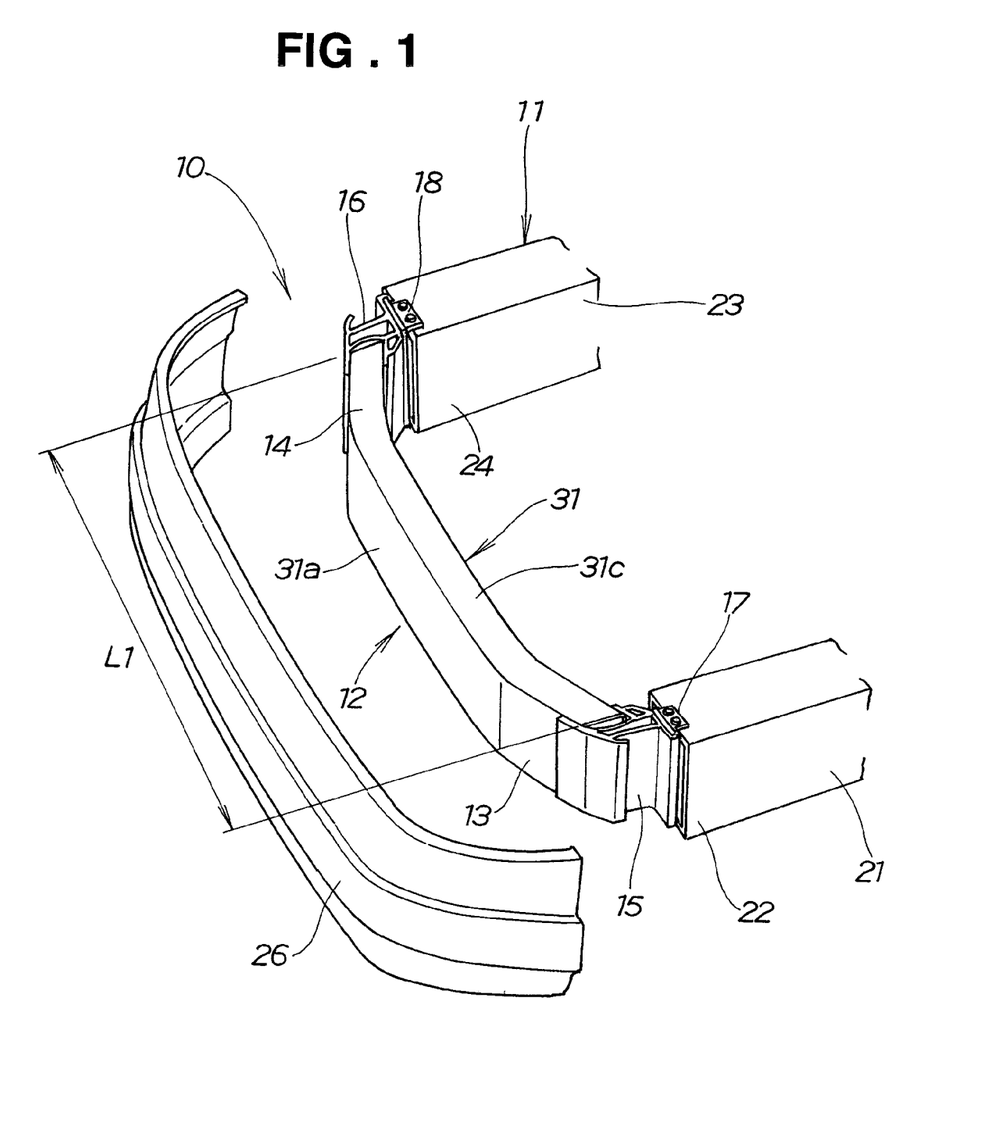
FIG. 1 is a perspective view of a bumper beam structure according to the present invention.

A bumper beam structure 10 according to the present invention shown in FIG. 1 includes a beam 12 disposed at the front of a vehicle body 11 (body end) in a transversely extending manner, and left and right corner members 15, 16 attached to left and right ends 13, 14 of the beam 12. The left corner member 15 is mounted to a front end 22 of a left front side member (vehicle frame member) 21 via a left mounting bracket 17. The right corner member 16 is mounted to a front end 24 of a right front side member (vehicle frame member) 23 via a right mounting bracket (mounting bracket) 18.

That is, the bumper beam structure 10 has the beam 12 mounted to the left and right front side members 21, 23 via the left and right corner members 15, 16 and the left and right mounting brackets 17, 18.

A bumper cover 26 is attached to the front of the beam 12 and the left and right corner members 15, 16.

The beam 12 is a member in a generally curved shape with its left and right ends 13, 14 bent obliquely rearward of the vehicle so that the left and right ends 13, 14 are inclined rearward of the vehicle.

Figure 3:
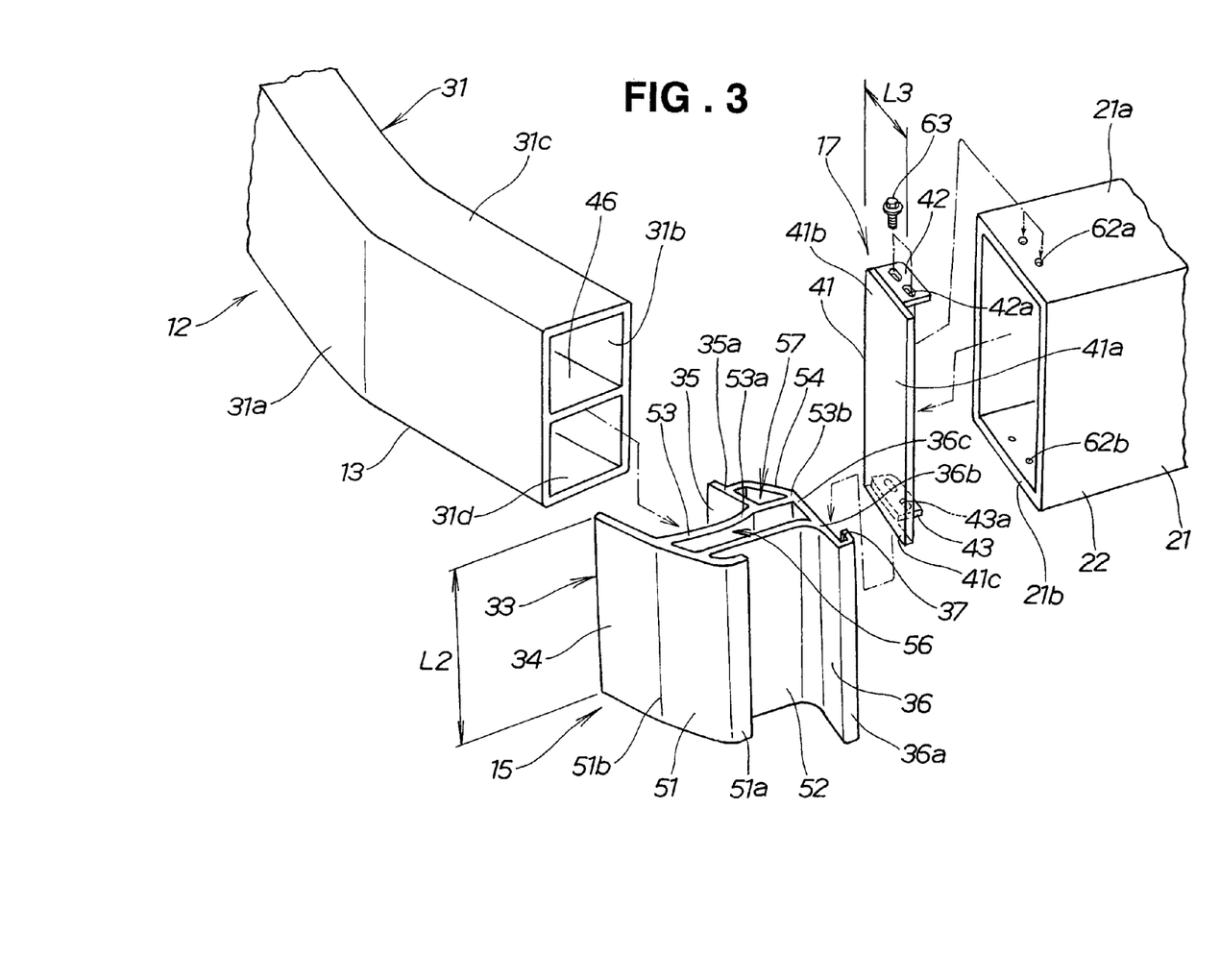
FIG. 3 is an exploded perspective view of the bumper beam structure shown in FIG. 2.

A periphery 31 of the beam 12 is formed in a rectangular cross-section shape, having a front surface 31a, a rear surface 31b (see FIG. 3), an upper surface 31c and a lower surface 31d (see FIG. 3).

The left and right corner members 15, 16 are symmetrical members, namely the members 15, 16 are identical in structure, although they are rotated 180° relative to each other as attached to the ends of beam 12. Hereinafter, only the left corner member 15 will be described to avoid redundant description of the right corner member 16.

Likewise, the left and right mounting brackets 17, 18 are symmetrical members. Hereinafter, only the left mounting bracket 17 will be described to avoid redundant description of the right mounting bracket 18.

Figure 2:
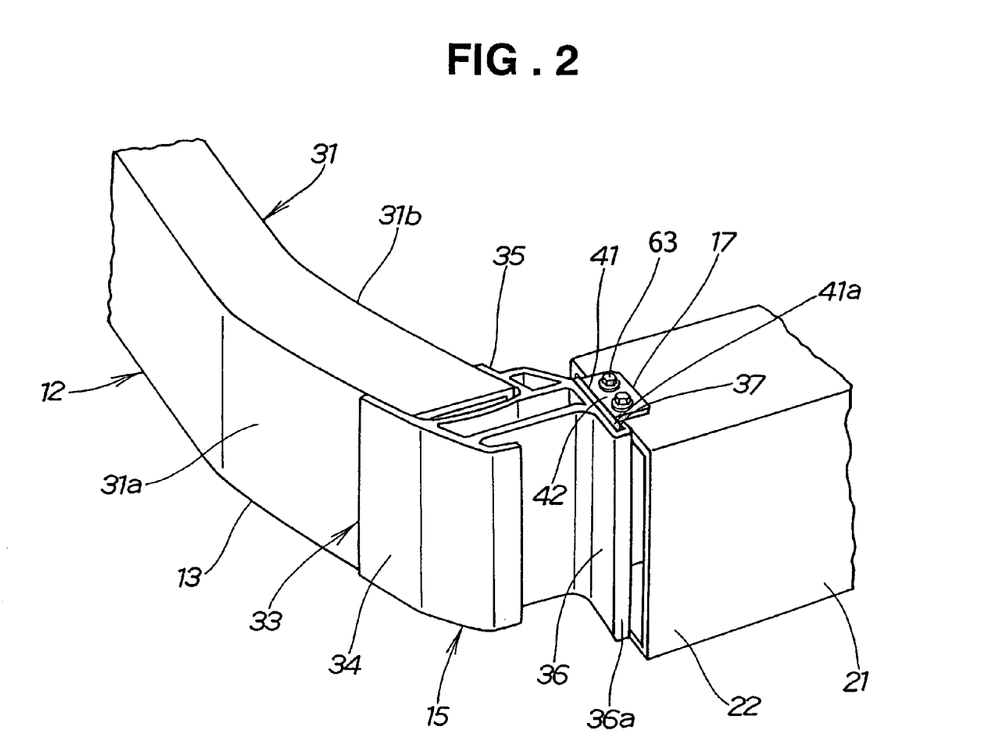
FIG. 2 is a perspective view of the bumper beam structure shown in FIG. 1, with a left corner member at the center.
Figure 4:
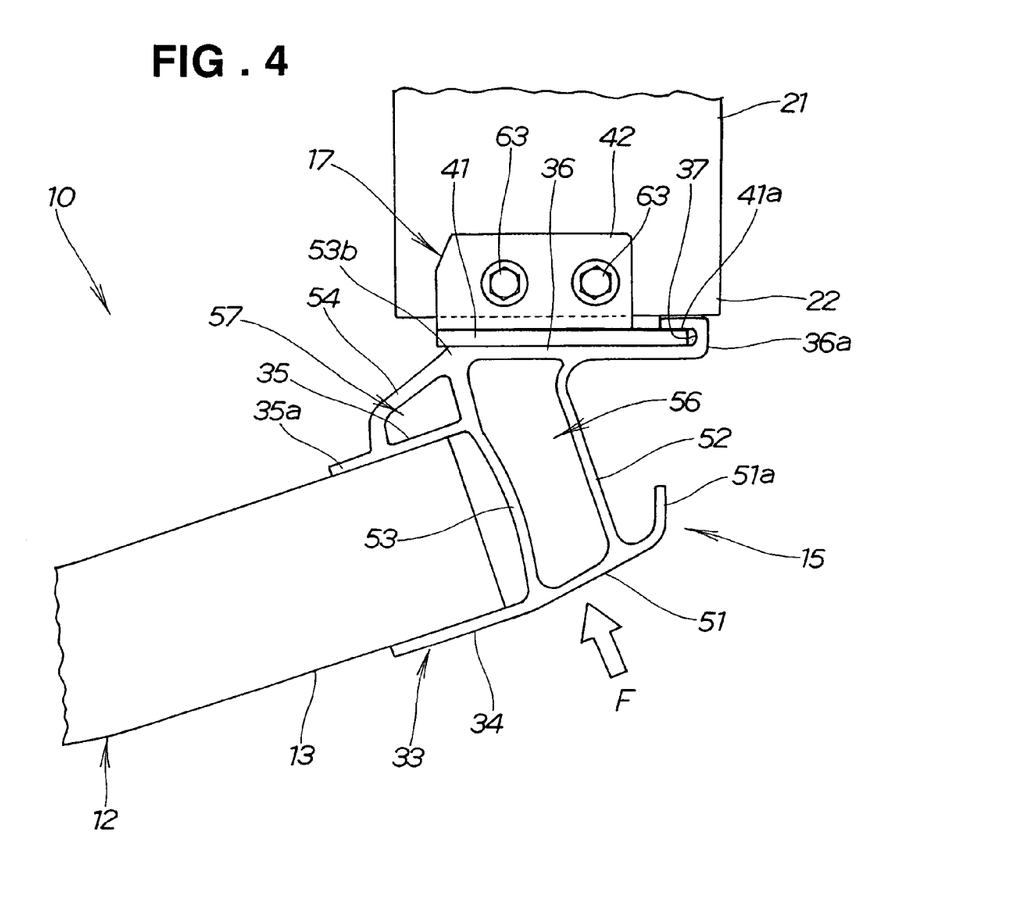
FIG. 4 is a plan view of the bumper beam structure shown in FIG. 2.

FIGS. 2, 3 and 4 illustrate a mounted state of a bumper beam left corner portion.

Referring to FIG. 2, the front surface 31a at the left end 13 of the beam 12 bent obliquely rearward of the vehicle is joined to a front joint wall (a front portion of a supporting portion 33) 34 of the left corner member 15. The rear surface 31b at the bent left end 13 is joined to a rear joint wall (a rear portion of the supporting portion 33) 35 of the left corner member 15. With this, the supporting portion 33 of the left corner member 15, defining an opening, is attached to the left end 13 of the beam 12.

The supporting portion 33 supporting the left end 13 of the beam 12 is comprised of the front joint wall 34 and the rear joint wall 35.

A vertical fitting groove 37 is formed at an outer edge 36a of a rear wall 36 of the left corner member 15. An outer edge 41a of a connecting plate 41 of the left mounting bracket 17 is fitted into the fitting groove 37. The connecting plate 41 of the left mounting bracket 17 is joined to the rear wall 36 of the left corner member 15.

Upper and lower mounting portions 42, 43 of the left mounting bracket 17 (see FIG. 3 about the lower mounting portion 43) are attached to the front end 22 of the left front side member 21 by a plurality of bolts 63. With this, the left corner member 15 attached to the left end 13 of the beam 12 is connected to the front end 22 of the left front side member 21 via the left mounting bracket 17.

This arrangement of connecting the left corner member 15 to the front end 22 of the left front side member 21 via the left mounting bracket 17 increases the degree of freedom in shape and layout of the left corner member 15 (e.g., in the case of displacing the left corner member 15 relative to the front end 22 for connection), as compared with a case where the left corner member 15 is directly connected to the front end 22 of the left front side member 21 without using the left mounting bracket 17.

As shown in FIG. 3, the beam 12 is a tubular rectangular body with its periphery 31 having the front surface 31a, the rear surface 31b, the upper surface 31c and the lower surface 31d, constituting a shock absorbing structure having a horizontal middle wall 46 formed in the middle inside.

The beam 12 is manufactured by extruding an aluminum material in a vehicle transverse direction (in other words, in a beam longitudinal direction), cutting an extruded beam material 48 (see FIG. 5A) to a predetermined length L1 (see FIG. 1), and then bending the left and right ends 13, 14 (see FIG. 1 about the right end 14) obliquely rearward of the vehicle.

The left corner member 15 includes a front wall 51 formed in a rectangular shape. An outer edge 51a of the front wall 51 is bent rearward.

The front joint wall 34 extends from an inner edge 51b of the front wall 51 toward the vehicle center. The rear wall 36 is formed rearward of the front wall 51. The fitting groove 37 is vertically formed at the outer edge 36a of the rear wall 36. An outer wall 52 is formed between a generally middle portion 36b of the rear wall 36 and the front wall 51. An inner wall 53 is formed between an inner edge 36c of the rear wall 36 and the inner edge 51b of the front wall 51. The rear joint wall 35 extends from a generally middle portion 53a of the inner wall 53 toward the vehicle center.

A reinforcing wall (wall) 54 extends from near an edge 35a of the rear joint wall 35 to a rear edge 53b of the inner wall 53, that is, as shown in FIG. 4, close to the front end 22 of the left front side member 21. The reinforcing wall 54 has a substantially L shape. The reinforcing wall 54 reinforces the rear joint wall 35 (supporting portion 33).

The left corner member 15 has first and second closed cross-section portions 56, 57. The first closed cross-section portion 56 is formed by the front wall 51, the rear wall 36, the outer wall 52 and the inner wall 53. The second closed cross-section portion 57 is formed by the rear joint wall 35, the inner wall 53 and the reinforcing wall 54.

The left corner member 15 is manufactured by extruding an aluminum material in a vertical direction, and cutting an extruded left corner member material 58 (see FIG. 5B) to a predetermined length L2.

The left mounting bracket 17 includes the rectangular connecting plate 41, the upper mounting portion 42 extended from an upper end 41b of the connecting plate 41 to the rear of the vehicle, and the lower mounting portion 43 extended from a lower end 41c of the connecting plate 41 to the rear of the vehicle. The upper mounting portion 42 has a pair of mounting holes 42a, 42a. The lower mounting portion 43 has a pair of mounting holes 43a, 43a.

The left mounting bracket 17 is manufactured by extruding an aluminum material, cutting an extruded left mounting bracket material 61 (see FIG. 5C) to a predetermined length L3, and then cutting off outer end portions of the upper and lower mounting portions 42, 43.

The left mounting bracket 17 is attached to the left corner member 15 by fitting the outer edge 41a of the connecting plate 41 into the fitting groove 37 of the left corner member 15, and joining the connecting plate 41 to the rear wall 36 of the left corner member 15.

With this state, the upper mounting portion 42 is disposed on an upper surface 21a of the left front side member 21, and the lower mounting portion 43 is disposed on a lower surface 21b of the left front side member 21. Then, the upper mounting portion 42 is fastened by bolts 63, 63 and nuts (not shown) through its mounting holes 42a, 42a and mounting holes 62a, 62a in the upper surface 21a. Also, the lower mounting portion 43 is fastened by bolts 63, 63 and nuts (not shown) through its mounting holes 43a, 43a and mounting holes 62b, 62b in the lower surface 21b.

Thus, the upper mounting portion 42 is bolted to the upper surface 21a, and the lower mounting portion 43 is bolted to the lower surface 21b, whereby the left end 13 of the beam 12 is connected to the front end 22 of the left front side member 21 via the left corner member 15 and the left mounting bracket 17.

As shown in FIG. 4, in some cases, an impact force F is applied obliquely from the front of the vehicle to the left corner member 15 as shown by an arrow. It is therefore preferable that the front wall 51 and the front joint wall 34 of the left corner member 15 be inclined to be substantially orthogonal to the direction of application of the impact force F. This is because the inclination of the front wall 51 and the front joint wall 34 provides a large area to receive the impact force F so that the impact force F can be received by the front wall 51 and the front joint wall 34 in a preferable manner.

For this, the left corner member 15 is constituted by an extruded member, and is attached to the left end 13 of the beam 12 with its axis in the extrusion direction oriented vertically. With this, some of a plurality of walls constituting the extruded left corner member 15 can be used as the front wall 51 and the front joint wall 34. Accordingly, when the left corner member 15 is extruded, the front wall 51 and the front joint wall 34 can be inclined substantially orthogonally to the direction of application of the impact force F.

That is, the front and rear joint walls 34, 35, or the supporting portion 33 for supporting the beam 12 can be formed to match the inclination of the left end 13 of the beam 12 in extrusion.

When the impact force F is applied to the front wall 51 and the front joint wall 34, the impact force F is transmitted through and generally in parallel with the outer wall 52 and the inner wall 53 which are generally orthogonal to the front wall 51, and then is transmitted to the left front side member 21 in a preferable manner.

Also, when the left corner member 15 is extruded, the outer edge 51a of the front wall 51 can be formed in a rearward bent shape. The left corner member 15 can thus be easily formed in a suitable shape for the type of vehicle, for example.

The reinforcing wall 54 reinforces the rear joint wall 35 of the supporting portion 33 and transmits an impact force applied to the rear joint wall 35 to the left front side member 21 in a preferable manner. The reinforcing wall 54 can be adjusted in thickness to facilitate an adjustment in strength of the rear joint wall 35, or the supporting portion 33.

The rear wall 36 can be formed in a desirable orientation when the left corner member 15 is extruded. The orientation of the rear wall 36 can be suitably decided for the front end 22 of the left front side member 21.

The fitting groove 37 is formed at the outer edge 36a of the rear wall 36 in a vertically extending manner in the extrusion molding. The outer edge 41a of the connecting plate 41 of the left mounting bracket 17 is fitted into the fitting groove 37, and thus the left corner member 15 is firmly fixed to the left front side member 21 via the left mounting bracket 17.

In the extrusion of the left corner member 15, the above-described first and second closed cross-section portions 56, 57 are formed in the extrusion direction. At that time, the closed cross-section portions 56, 57 can be adjusted appropriately in number, shape and size, so that the left corner member 15 can be relatively easily provided with necessary strength.

Figure 5A:
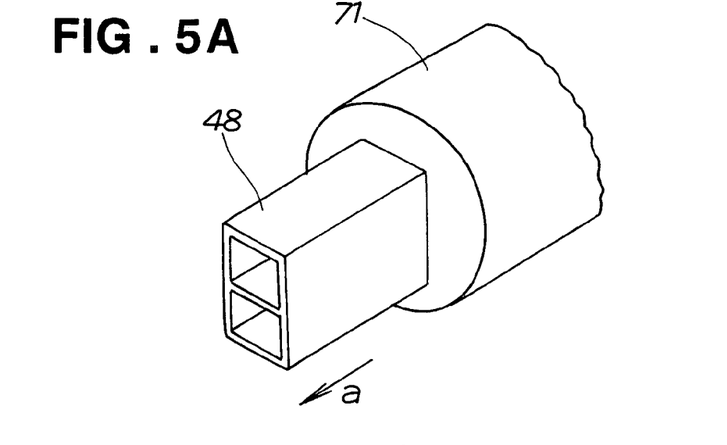
FIGS. 5A, 5B and 5C are diagrams illustrating the manufacturing of a beam, a corner member, and a mounting flange by extrusion molding.
Figure 5B:
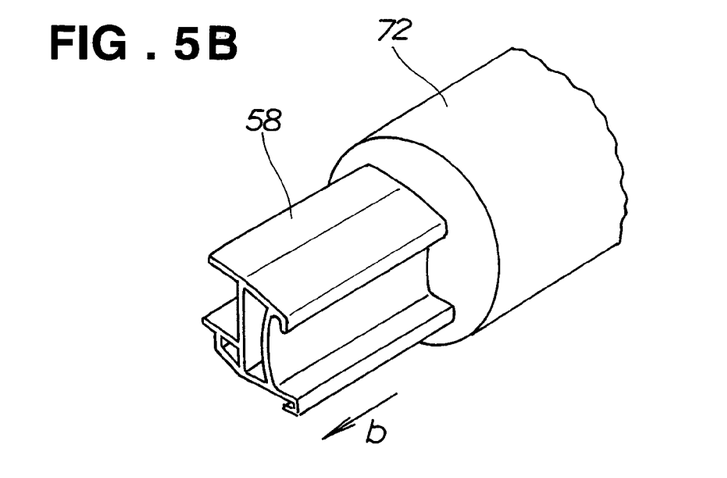
Figure 5C:
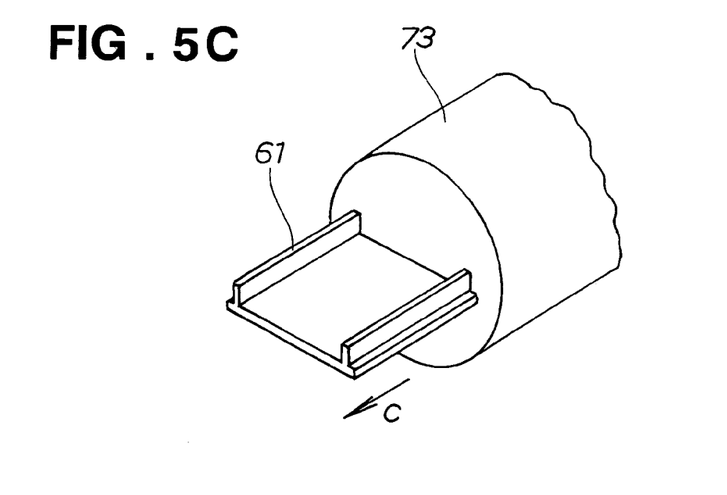

FIGS. 5A, 5B and 5C illustrate manufacturing of the beam 12, the corner member 15, 16, and the mounting bracket 17, 18 with their respective extruding machines.

As shown in FIG. 5A, the aluminum beam material 48 is extruded from a beam extruding machine 71 as shown by arrow a.

The extruded beam material 48 is cut to the predetermined length L1 (see FIG. 1), and then the left and right ends 13, 14 are bent obliquely rearward of the vehicle as shown in FIG. 1. With this, the aluminum beam 12 (see FIGS. 1 and 3) extruded in a direction corresponding to a vehicle transverse direction (that is, a beam longitudinal direction) can be obtained.

The extrusion molding of the beam 12 allows the beam 12 to be manufactured continuously, leading to increased productivity of the beam 12.

As shown in FIG. 5B, the aluminum corner member material 58 is extruded as shown by arrow b, using a corner member extruding machine 72.

The extruded corner member material 58 is cut at the predetermined length L2 (see FIG. 3). With this, the left and right aluminum corner members 15, 16 (see FIG. 1) can be obtained. The obtained left and right corner members 15, 16 are used with their axes in the extrusion direction oriented in a vehicle vertical direction, that is, oriented orthogonally to the beam 12 in the vertical direction.

By extruding the single corner member material 58 and then cutting it at a predetermined length, the left and right corner members 15, 16 can be manufactured continuously at a time, and thus the left and right corner members 15, 16 can be efficiently manufactured. In addition, there is no need to manufacture the left and right corner members 15, 16 separately, which results in increased productivity.

As shown in FIG. 5C, the aluminum mounting bracket material 61 is extruded as shown by arrow c, using a mounting bracket extruding machine 73.

The extruded mounting bracket material 61 is cut to a predetermined length L3 (see FIG. 3), and then, the outer end portions of the upper and lower mounting portions 42, 43 shown in FIG. 3 are cut off. With this, the aluminum left and right mounting brackets 17, 18 (see FIG. 1) can be obtained at once, which leads to increased productivity.

As shown in FIGS. 5A to 5C, manufacturing of the beam 12, the left and right corner members 15, 16, and the left and right mounting brackets 17, 18 can be increased in productivity, resulting in increased productivity of the bumper beam structure 10.

In this embodiment, the beam 12, the corner members 15, 16, and the mounting brackets 17, 18 are made from aluminum material. Aluminum material is molded relatively easily, and is a suitable material for extrusion molding. Accordingly, manufacturing of the beam 12, the corner members 15, 16, and the mounting brackets 17, 18 are further increased in productivity, resulting in further increased productivity of the bumper beam structure 10. Aluminum material is a light material, resulting in a reduced weight of the bumper beam structure 10.

Figure 6A:
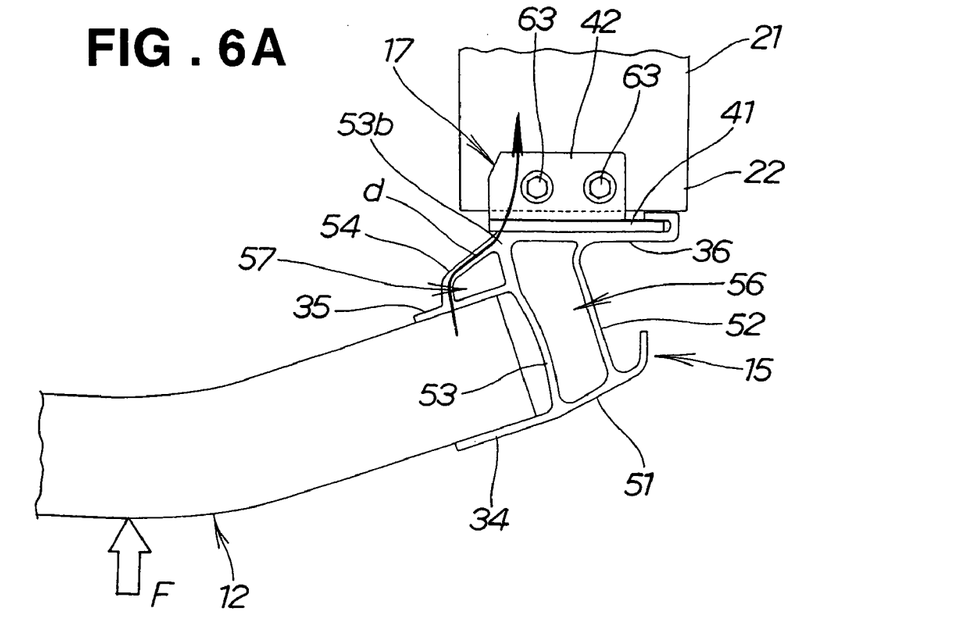
FIGS. 6A and 6B are diagrams illustrating ways in which an impact force acting on the beam and an impact force acting on the corner member are transmitted to a vehicle frame member.
Figure 6B:
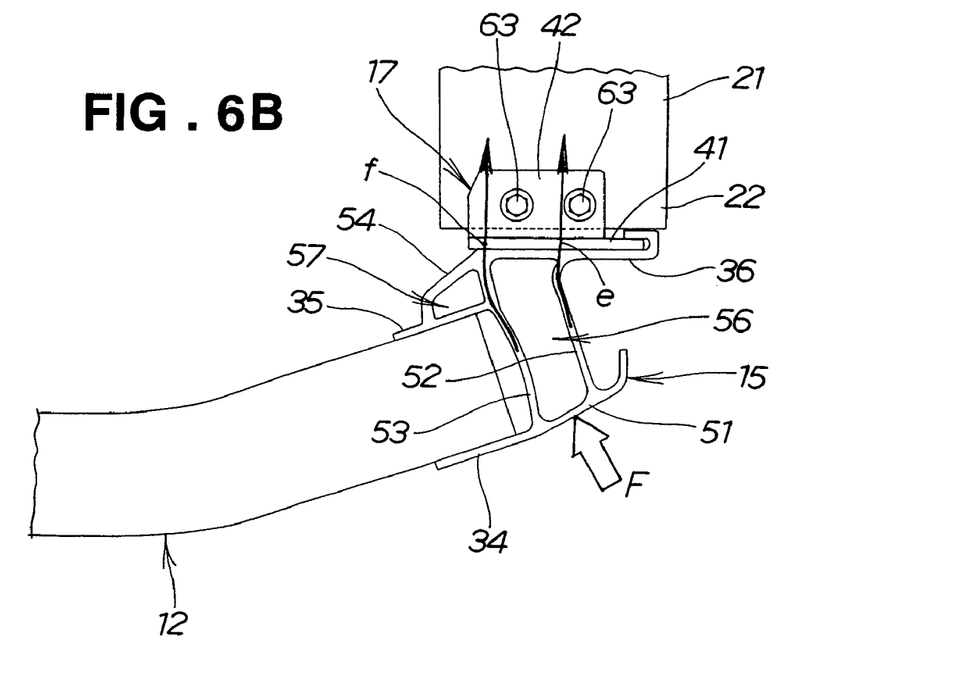

Now, transmission of an impact force applied to the bumper beam 12 will be described with reference to FIGS. 6A and 6B. FIG. 6A illustrates an example in which an impact force is applied to the bumper beam 12; and FIG. 6B illustrates an example in which an impact force is applied to the left corner member 15.

As shown in FIG. 6A, when an impact force F is applied to the beam 12 from the vehicle front as shown by an arrow, the impact force F applied to the beam 12 is transmitted to the rear joint wall 35 of the left corner member 15. The impact force transmitted to the rear joint wall 35 is transmitted to the rear edge 53b of the inner wall 53 through the reinforcing wall 54 as shown by arrow d, and is further transmitted to the rear wall 36 of the left corner member 15.

The left corner member 15 is provided with the first closed cross-section portion 56 and the second closed cross-section portion 57, so that the left corner member 15 is increased in strength to be unlikely to deform. Thus, the impact force F applied to the beam 12 is sufficiently transmitted to the rear wall 36 of the left corner member 15.

As described above, since the reinforcing wall 54 is provided, and also the first and second closed cross-section portions 56, 57 are provided, the impact force F applied to the beam 12 is efficiently transmitted to the rear wall 36 of the left corner member 15.

The impact force transmitted to the rear wall 36 of the left corner member 15 is transmitted through the left mounting bracket 17 and the bolts 63, 63 to the front end 22 of the left front side member 21. Thus, the impact force F applied to the beam 12 is absorbed by the left front side member 21.

FIG. 6B shows an impact force F applied obliquely from the vehicle front to the front wall 51 of the left corner member 15 as shown by an arrow. The front wall 51 is inclined, providing a large area to receive the impact force F, and thus the impact force F is received by the front wall 51 in a preferable manner. The impact force F applied to the front wall 51 of the left corner member 15 is transmitted through the outer wall 52 and the inner wall 53 to the rear wall 36 as shown by arrows e and f. In particular, since the outer wall 52 and the inner wall 53 are generally orthogonal to the front wall 51, the impact force F applied to the front wall 51 is efficiently transmitted to the rear wall 36.

Also, since the left corner member 15 is provided with the first closed cross-section portion 56 and the second closed cross-section portion 57, the left corner member 15 is increased in strength to be unlikely to deform. Accordingly, the impact force F applied to the front wall 51 is sufficiently transmitted to the rear wall 36.

As described above, since the outer wall 52 and the inner wall 53 are made orthogonal to the front wall 51, and the first and second closed cross-section portions 56, 57 are provided, the impact force F applied to the left corner member 15 is efficiently transmitted to the rear wall 36 of the left corner member 15.

The impact force F transmitted to the rear wall 36 of the left corner member 15 is transmitted through the left mounting bracket 17 and the bolts 63, 63 to the front end 22 of the left front side member 21. Thus, the impact force F applied to the left corner member 15 can be efficiently absorbed by the left front side member 21.

This embodiment has been described with an example in which the left corner member 15 is provided with the two closed cross-section portions (first and second closed cross-section portions) 56, 57 as a plurality of closed cross-section portions, which is not limiting. The number of closed cross-section portions provided to the left corner member 15 can be determined appropriately.

The shapes of the beam 12, the left corner member 15 and the left mounting bracket 17 illustrated in this embodiment are not limiting in the present invention.

This embodiment has been described with an example in which the bumper beam structure 10 is provided at the front of the vehicle body 11, which is not limiting. The bumper beam structure 10 may be provided at the rear of the vehicle body 11.

Also, this embodiment has been described with an example in which the reinforcing wall 54 of the left corner member 15 is formed in a substantially L shape, but the reinforcing wall 54 is not limited to this shape, and may be formed in a linear shape, for example.

Obviously, various minor changes and modifications of the present invention are possible in the light of the above teaching. It is therefore to be understood that within the scope of the appended claims the invention may be practiced otherwise than as specifically described.

What is claimed is:

1. A bumper beam structure comprising:
   a beam capable of being disposed at a front portion of a vehicle body in such a manner as to extend in a vehicle transverse direction; and
   right and left corner members attached to right and left ends of the beam respectively;
   the beam being mountable to front ends of vehicle frame members via the right and left corner members;
   wherein the beam is an extruded member and is disposed with an axis in an extrusion direction oriented in the vehicle transverse direction;
   the right and left corner members are extruded members and are attached to the right and left ends of the beam respectively, each of said corner members arranged with an axis in an extrusion direction oriented in a vertical direction; and
   wherein the corner members cap lateral ends of the beam.

2. A bumper beam structure as set forth in claim 1, wherein the right and left corner members have a plurality of closed cross-section portions formed in the extrusion direction.

3. A bumper beam structure as set forth in claim 1, wherein the right and left corner members have respective supporting portions formed toward the right and left ends of the beam for supporting the right and left ends, and have respective walls extending from the supporting portions close to the vehicle frame members for reinforcing the supporting portions.

4. A bumper beam structure as set forth in claim 1, wherein the beam and the right and left corner members are made from a material comprising aluminum.

5. A bumper beam structure as set forth in claim 1, wherein the right and left corner members are connectable to the vehicle frame members via respective mounting brackets made from extruded aluminum material.

6. A bumper beam structure as set forth in claim 1, wherein the right and left corner members have respective front walls extending in the vertical direction, the front walls being inclined toward the front ends of the vehicle frame members at outer side portions opposite to attached sides to the right and left ends of the beam.

7. A bumper beam structure as set forth in claim 1, wherein said right and left corner members are substantially identical.

8. A bumper beam structure as set forth in claim 1, wherein said right and left corner members are cut lengths of the same extrusion.

9. A bumper beam structure as set forth in claim 5, wherein said right and left corner members include fitting grooves into which outer edges of the mounting brackets are fitted.

10. A bumper beam structure as set forth in claim 5, wherein said right and left corner members are substantially identical to one another, and said mounting brackets are substantially identical to one another.

11. A bumper beam structure comprising:
    a beam capable of being disposed at a front portion of a vehicle body in such a manner as to extend in a vehicle transverse direction; and
    right and left corner members attached to right and left ends of the beam respectively;
    the beam being mountable to front ends of vehicle frame members via the right and left corner members;
    wherein the beam is an extruded member and is disposed with an axis in an extrusion direction oriented in the vehicle transverse direction;
    the right and left corner members are extruded members and are attached to the right and left ends of the beam respectively, each of said corner members arranged with an axis in an extrusion direction oriented in a vertical direction; and
    wherein each said corner member defines an opening which receives a respective lateral end portion of the beam therein.

12. A bumper beam structure as set forth in claim 11, wherein the opening is a socket.

13. A bumper beam structure comprising:
    a beam capable of being disposed at a front portion of a vehicle body in such a manner as to extend in a vehicle transverse direction;
    right and left corner members attached to right and left ends of the beam respectively; each said corner member having a fitting groove; and
    right and left mounting brackets attached to the vehicle body; each said mounting bracket comprising a connecting plate engaged with the fining groove of the corner member;
    the beam being mountable to front ends of vehicle frame members via the right and left corner members;
    wherein
    each said corner member abuts front and rear portions of the connecting plate of the mounting bracket;
    the beam is an extruded member and is disposed with an axis in an extrusion direction oriented in the vehicle transverse direction; and
    the right and left corner members are extruded members and are attached to the right and left ends of the beam, each said corner member with an axis in an extrusion direction oriented in a vertical direction.

14. A bumper beam structure as set forth in claim 13, wherein the corner members cap lateral ends of the beam.

15. A bumper beam structure as set forth in claim 13, wherein the right and left corner members have a plurality of closed cross-section portions formed in the extrusion direction.

16. A bumper beam structure as set forth in claim 13, wherein the right and left corner members have respective supporting portions formed toward the right and left ends of the beam for supporting the right and left ends, and have respective walls extending from the supporting portions close to the vehicle frame members for reinforcing the supporting portions.

17. A bumper beam structure as set forth in claim 13, wherein the beam and the right and left corner members are made from a material comprising aluminum.

18. A bumper beam structure as set forth in claim 13, wherein said right and left corner members are substantially identical to one another, and said mounting brackets are substantially identical to one another.

19. A bumper beam structure as set forth in claim 13, wherein the mounting brackets include a plurality of mounting portions attached to the connecting plate; and wherein the mounting portions are attached to the vehicle body.

20. A bumper beam structure as set forth in claim 13, wherein each said connecting plate has a plurality of mounting holes formed therein.

* * * * *